(12) United States Patent
Fuchik et al.

(10) Patent No.: US 7,992,013 B2
(45) Date of Patent: Aug. 2, 2011

(54) ADAPTIVE CAPACITY POWER SUPPLY

(75) Inventors: John S. Fuchik, Columbus, OH (US);
Bret P. Fox, Sunbury, OH (US); Russell E. Shetler, Jr., Delaware, OH (US);
Ricardo A. Luquias, Pataskala, OH (US); Xiao Xueli, Shenzhen (CN); Zhou Dangsheng, Shenzhen (CN); Liu Bo, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 936 days.

(21) Appl. No.: 11/937,428

(22) Filed: Nov. 8, 2007

(65) Prior Publication Data

US 2009/0126008 A1 May 14, 2009

(51) Int. Cl.
*G06F 1/00* (2006.01)
*H02J 1/10* (2006.01)
(52) U.S. Cl. .......................................... 713/300; 307/43
(58) Field of Classification Search ................ 726/19; 713/340
See application file for complete search history.

(56) References Cited

U.S. PATENT DOCUMENTS

| | | | |
|---|---|---|---|
| 7,382,063 B2 * | 6/2008 | Mullet et al. | 307/64 |
| 2003/0160692 A1 * | 8/2003 | Nonaka | 340/539.11 |
| 2005/0264772 A1 * | 12/2005 | Masukawa | 353/122 |

OTHER PUBLICATIONS

Pollo et al. "A Network-oriented Power Management Architecture" IEE (2004). pp. 693-706.*
Liebert Corporation. "Scalable, On-Line UPS for Growing Data Centers." Emerson Network Power. [retrieved from the Internet on Feb. 25, 2008 using <URL: http://www.liebert.com/product_pages/ProductDocumentation.aspx?id=244>].
Liebert Corporation. "Liebert NX: UPS for Small and Medium Business." Emerson Network Power. [retrieved from the Internet on Feb. 25, 2008 using <URL: http://www.liebert.com/common/ViewDocument.aspx?id=829>].

* cited by examiner

*Primary Examiner* — Nathan Flynn
*Assistant Examiner* — Abdullah Almamun
(74) *Attorney, Agent, or Firm* — Locke Lord Bissell & Liddell LLP (57) ABSTRACT

Methods and systems are disclosed for automatically tracking and controlling the capacity ratings of UPS units. The methods and systems provide a central server or repository for storing the capacity ratings, grant kVA and grant code authorized for each UPS unit along with a unique security key for each unit. When a customer purchases a capacity upgrade, the server updates the capacity rating for the customer's unit and issues an upgrade grant that includes the new rating and the grant code. The upgrade grant may thereafter be downloaded by a service technician and used to upgrade the unit. Alternatively, the upgrade grant may be downloaded directly to the UPS unit, and the unit's software and/or firmware may perform the upgrade automatically. In either case, the upgrade may be performed through a software modification, thus eliminating the need for the technician to physically swap out hardware. Such an arrangement helps ensure that only authorized capacity upgrades are performed.

20 Claims, 6 Drawing Sheets

ADAPTIVE CAPACITY POWER SUPPLY

CROSS REFERENCE TO RELATED APPLICATIONS

Not applicable

STATEMENT REGARDING FEDERALLY SPONSORED RESEARCH OR DEVELOPMENT

Not applicable

REFERENCE TO APPENDIX

Not applicable

BACKGROUND OF THE INVENTION

1. Field of the Invention

The invention disclosed and taught herein relates generally to power supply systems and particularly uninterruptible power supply (UPS) systems. More specifically, the invention relates to methods and systems for modifying the available capacity of such UPS systems.

2. Description of the Related Art

Almost all companies that have mission critical applications rely on UPS systems to back up the power supply on their computer equipment. The capacity of the UPS systems typically depends on the type of computer equipment being backed up. A UPS system for a single server, for instance, would have a different capacity rating from one used to support a server farm. Examples of commonly available capacity ratings for UPS units include 10, 15, 20, 30, 40, 60, 80, 100, 120, 140, 160, 180, and 200 kVA (kilovolt-amps).

As companies grow and add more computer equipment, their UPS capacity requirement increases. These increases may exceed existing UPS capacity ratings despite their best efforts to predict short-term or long-term requirements. As a result, the companies may need to add additional UPS units or replace their UPS systems with higher-rated systems, or both. However, either of these options can be costly and time-consuming, and it may not even be possible in some cases to add additional UPS units due to space limitations.

To address the above problem, some UPS manufacturers offer derated modules that are capable of a higher rating, but are hardware configured for a lower rating. For example, the UPS manufacturers may physically derate a 120 kVA module and sell it as a 60 kVA unit. Then, when customers wish to purchase a higher rating, the UPS manufacturers may simply reconfigure the hardware in the 60 kVA unit for the higher rating (e.g., 80 kVA, 100 kVA, 120 kVA, etc.). Of course, the UPS unit cannot be upgraded beyond its maximum capacity rating. Still, so long as load requirements can be met, the capacity upgrade is easier and less expensive for both the customers and the UPS manufacturers than replacing the entire UPS system or adding additional UPS units.

But the above arrangement is not without drawbacks. For example, the current process for upgrading capacity is largely a manual one that requires a service technician from the UPS manufacturer to physically visit the customers' site in order to perform the upgrade. The upgrade typically requires one or more hardware components be replaced, which means the components must be ordered if not already in stock. Schedules must also be coordinated between the customer, the service technician, and the availability of the hardware components. In addition, unethical customers may attempt to obtain the hardware components and perform the upgrade themselves without duly purchasing it from the UPS manufacturers.

Accordingly, what is needed is a way to automate the capacity upgrade process for UPS units that are capable of multiple capacity ratings. More particularly, what is needed is a way to automatically track and control the capacity ratings of such UPS units so that only authorized upgrades may be performed.

BRIEF SUMMARY OF THE INVENTION

The present invention is directed to methods and systems for automatically tracking and controlling the capacity ratings of UPS units that are capable of multiple capacity ratings. The methods and systems provide a central server or repository for storing the capacity ratings that have been authorized for each UPS unit along with, among other things, a unique security key for each unit. When a customer purchases a capacity upgrade for a particular UPS unit, the central server or repository updates the authorized capacity rating for that unit. The central server or repository then issues grant code that includes the new capacity rating and the unique security key for the unit. The grant code may thereafter be downloaded by a service technician and used to upgrade the UPS unit once the security key is confirmed. Alternatively, the grant code may be downloaded directly to the UPS unit, and the unit's software and/or firmware may perform the upgrade automatically upon confirmation of the security key. In either case, a software modification may be used to perform the upgrade, thus eliminating the need for the technician to physically swap out hardware components. Such an arrangement helps ensure that only authorized capacity upgrades may be performed.

In general, in one aspect, the invention is directed to a method of managing capacity ratings for an uninterruptible power supply (UPS) unit capable of multiple capacity ratings. The method comprises, among other things, generating a grant code for the UPS unit at a first location, the grant code including an authorized capacity rating for the UPS unit and transferring the grant code to a second location different from the first location. The method further comprises extracting the authorized capacity rating from the grant code at the second location and configuring the UPS unit to operate with the authorized capacity rating extracted from the grant code.

In general, in another aspect, the invention is directed to an uninterruptible power supply (UPS) unit capable of multiple capacity ratings. The UPS unit comprises, among other things, an input source or a stored energy source adapted to provide power for the UPS unit, and a monitor module adapted to store an initial capacity rating for the UPS unit and a maximum capacity rating for the UPS unit. The UPS unit further comprises electrical components adapted to impose a limit on the power provided by the input source or the stored energy source of the UPS unit. The electrical components may be configured to increase the limit on the power provided by the input source or the stored energy source of the UPS unit from the initial capacity rating up to the maximum capacity rating.

In general, in still another aspect, the invention is directed to a computer-readable medium encoded with computer-readable instructions for managing capacity ratings in an uninterruptible power supply (UPS) unit capable of multiple capacity ratings. The computer-readable instructions comprises instructions for causing a computer to, among other things, generate a grant code for the UPS unit, the grant code including an authorized capacity rating for the UPS unit, and store the grant code for the UPS unit in a grants repository. The computer-readable instructions further comprises instructions for causing a computer to receive a request for a capacity rating from a remote location in connection with the UPS unit and transmit the grant code stored in the grants repository to the remote location over a network.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention are described below with reference to block diagrams and/or operational illustrations of methods. It will be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the Figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Figure 1:
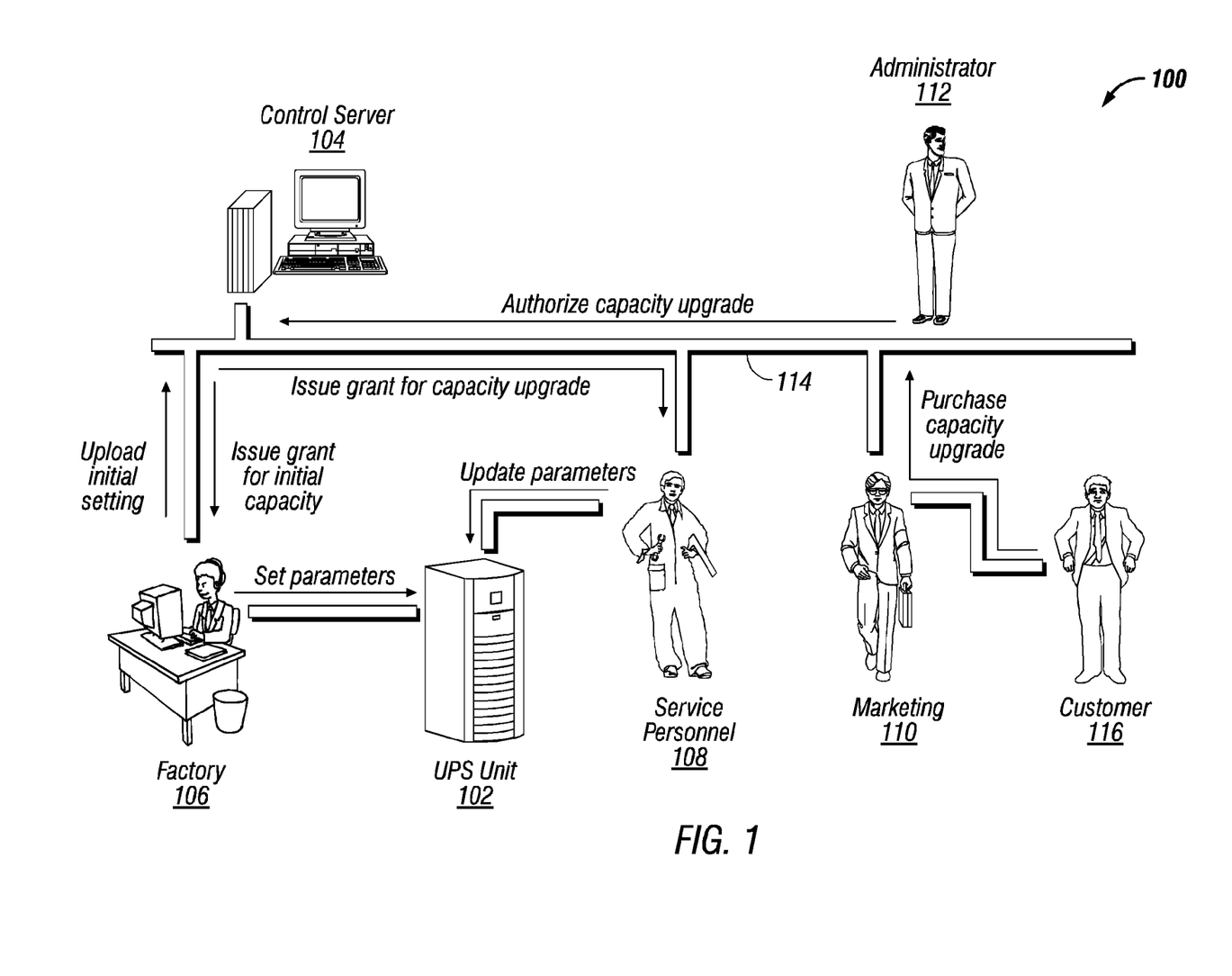
FIG. 1 illustrates an exemplary infrastructure for tracking and controlling capacity ratings of UPS units according to embodiments of the invention.

FIG. 1 illustrates of an exemplary infrastructure 100 for automatically tracking and controlling capacity or kVA ratings for UPS units according to embodiments of the invention. The infrastructure 100 comprises, among other things, a remotely located UPS unit 102 and a central control server 104. It should be noted that a single UPS unit 102 is shown purely for illustrative purposes, and that numerous UPS units 102 may be tracked and controlled with the infrastructure 100 without departing from the scope of the invention. Other components of the infrastructure 100 may include a factory 106, service personnel 108, marketing personnel 110, and administrative personnel 112, all connected to one another over a network 114, such as the Internet or a private intranet. These various components of the infrastructure 100 and their interactions are described in more detail later herein.

The UPS unit 102 shown here is a special type of UPS unit that is capable of future ratings upgrade. This is because the UPS unit 102 is designed for a higher rating than the rating at which it is actually sold. The UPS unit 102 may then be upgraded to the higher rating upon payment of an appropriate upgrade fee by a customer 116. Thus, for example, a UPS unit 102 that is fully rated at 80 kVA may be initially configured and sold with a rating of 40 kVA, then subsequently upgraded to 60 kVA, then 80 kVA as the load requirement of the customer 116 expands. This allows a UPS manufacturer to simplify its product line by offering multiple UPS ratings that are based on a single or only a few UPS models.

The fully-rated UPS unit 102 may be designed around several optimum design points. These design points may include, for example, 10, 15, 20, 30, 40, 60, 80, 100, 120, 140, 160, 180, and 200 kVA, and so on. The design points may be based on fully-rated components that may include, for example, input/output termination blocks, circuit breakers, fuse blocks, power wiring, transformers, capacitors, conductors, power electronic switching devices and similar components known to those having ordinary skill in the art. In accordance with embodiments of the invention, the design points of the UPS unit 102 may be set via software configuration, thus eliminating the need for hardware upgrades.

Advantages of the UPS unit 102 include the ability to adapt to changing load requirements and source capacity with minimal reconfiguration and operational disruption. This is particularly useful, for example, when customer load configurations, typically in Web hosting facilities, undergo continuous expansion as capacity is added in increments. The UPS unit 102 may thus be used as a building block for a scalable UPS system. Multiple such UPS units 102 may be combined in parallel with one another and/or with conventional UPS units to expand the scalable UPS system.

In operation (and referring still to FIG. 1), as each UPS unit 102 is assembled in the factory 106, a unique security number or key is created and assigned to that UPS unit 102 for tracking and control purposes. Such a security key may be implemented in the form of an integrated circuit or chip, for example, a DS2411 available from Maxim Integrated Products, Inc. of Sunnyvale, Calif., or similar security key chips. The security key chip functions to present the security key on its output terminals and is typically designed so that the unique security key thereon cannot be altered without damaging or destroying the chip. Once the security chip has been installed, the process of configuring the UPS unit 102 with the initial kVA rating purchased by the customer may begin.

To configure the UPS unit 102, a grant code for the purchased kVA rating must be obtained from the control server 104. Furthermore, the grant code from the control server 104 must include the security key of the UPS unit 102. This helps ensure only authorized configurations are made, and made only to the correct UPS units 102. The configuration begins when personnel at the factory 106 send or otherwise upload a grant request to the control server 104 using configuration software. The request may be in the form of binary or text file, preferably encrypted, containing the initial settings for the UPS unit 102. The configuration software may be any suitable configuration software known to those having ordinary skill in the art, including ParamSet from Liebert Corporation of Columbus, Ohio. The initial settings in the binary or text file may include, for example, the fully-rated or model kVA rating of the UPS unit 102, the granted or purchased kVA rating bought by the customer (which may be less than the model kVA), the security key, the serial number of the UPS unit 102, and other similar information.

After confirmation of the purchased kVA rating by the administrative personnel 112, the control server 104 may create a record, file, or database entry for the UPS unit 102 that contains the initial settings. The control server 104 may thereafter generate a grant code for the UPS unit 102 comprising the purchased or grant kVA rating, the security key, and possibly other information. The grant code may be in the form of a numeric or alphanumeric code that may be transmitted as a data string, preferably encrypted, to the factory 106. The encrypted numeric or alphanumeric grant code may also be stored in a binary or text file, also preferably encrypted, that may be downloaded to the factory 106. Upon receiving and decrypting the grant code, and extracting the security key and the grant kVA rating from the control server 104 (via the configuration software), the personnel at the factory 106 may configure the UPS unit 102 with the initial grant rating and activate the unit.

In some embodiments, an encrypted verification number may be generated by the control server 104 from the grant kVA rating and the security key information and subsequently sent with the grant code. Any suitable encryption algorithm known to those having ordinary skill in the art may be used to generate the encrypted verification number. Then, each time the UPS unit 102 is powered on, software and/or firmware in the UPS unit 102 compares the security key residing on the UPS unit 102 and the grant kVA rating of the UPS unit 102 to their counterparts in the verification number. In one implementation, the comparison may be performed by the UPS unit 102 reproducing the verification number from the grant kVA rating and the security key residing on the UPS unit 102 and comparing it to the verification number generated by the control server 104 (which may be stored in the UPS unit 102). If the two verification numbers do not match, meaning either the security keys or the grant kVA ratings are not the same, then the software and/or firmware causes the UPS unit 102 to cease operation or to otherwise only operate at some minimum default kVA rating. Such an arrangement helps prevent unscrupulous parties from making unauthorized modification to the kVA rating of the UPS unit 102.

If the customer 116 determines later that a capacity upgrade is needed for the UPS unit 102, the customer 116 may purchase the upgrade through the marketing personnel 110 of the UPS manufacturer. The marketing personnel 110 may then route the purchase, including a purchase order, kVA rating requested, payment amount, and the like, to the administrative personnel 112. If the purchase order, upgrade fee, and other information appear to be in order, the administrative personnel 112 may authorize the upgrade. Authorization may be accomplished by the administrative personnel 112 logging in to the control server 104 and updating the record for the UPS unit 102 in the control server 104 with the new kVA rating and any other pertinent information.

In the meantime, the customer 116 may notify the service personnel 108 that a capacity upgrade has been purchased and request the service personnel 108 to begin the upgrade process. The service personnel 108 may then generate an upgrade request for the UPS unit 102 using the configuration software and may send the request to the control server 104. The request may be in the form of a binary or text file, preferably encrypted, and similar to the file generated by the factory 106 to request the initial grant kVA from the control server 104.

Upon receiving the request, the control server 104 may respond by transmitting the grant code corresponding to the UPS unit 102 to the service personnel 108. Another encrypted verification number may be generated at this time based on the upgrade kVA rating and the security key and sent along with the grant code. The service personnel 108 may thereafter update the parameters of the UPS unit 102 with the new kVA rating and any other pertinent parameters using the configuration software. In performing the upgrade, the software and/or firmware in the UPS unit 102 may confirm the security key in the grant code matches the security key of the UPS unit 102. The encrypted verification number may then be stored in the UPS unit 102 and used as part of a power-on check in the manner described above to ensure there have been no unauthorized modification of the kVA rating.

Figure 2:
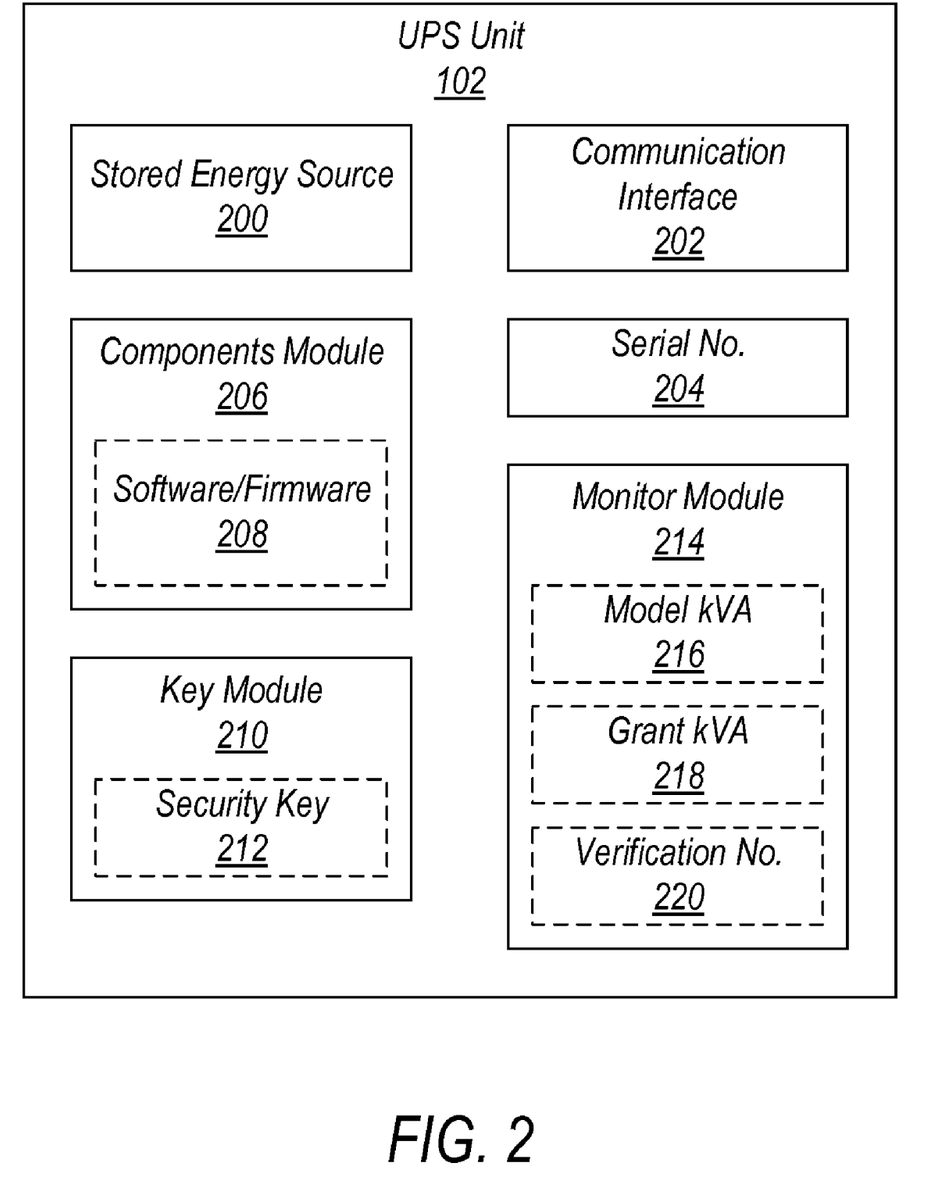
FIG. 2 illustrates an exemplary UPS unit capable of receiving a capacity upgrade according to embodiments of the invention.

Referring now to FIG. 2, an exemplary UPS unit 102 capable of receiving capacity upgrades according to embodiments of the invention is shown. The UPS unit 102 may comprise, among other things, batteries 200 or other input source or stored energy source that provide power for the UPS unit 102, a communications interface 202 for allowing the UPS unit 102 to communicate with external devices, and a serial number 204 for identifying the UPS unit 102. The batteries 200 may be any suitable UPS batteries having sizes and capacities well known to those having ordinary skill in the art and are therefore not described in detail here. Likewise, the communications interface 202 may be a network interface card or any suitable communications interface capable of implementing a standard communications protocol, such as RS232, RS485, Ethernet, TCP/IP, and the like. As for the serial number 204, although shown as a discrete component, the serial number 204 may be in any form capable of identifying the UPS unit 102, including a serial number label.

A components module 206 may be provided in the UPS unit 102. The components module 206 contains or otherwise houses the various electrical components, and any software associated therewith, that are used in that UPS unit 102. Such electrical components are preferably components that have been fully rated for the model kVA rating of the UPS unit 102. Examples of fully-rated components that may be contained or house by the components module 206 may include input/output termination blocks, circuit breakers, fuse blocks, power wiring, transformers, capacitors, conductors, power electronic switching devices and similar components known to those having ordinary skill in the art. Software and/or firmware 208 on the components module 206 may then be used to set and reset the parameters of the various components to achieve the desired kVA rating for the UPS unit 102. Such an arrangement obviates the need to physically swap out one or more hardware components in order to adjust the kVA rating of the UPS unit 102 and allows the unit to the upgraded remotely through software.

In accordance with embodiments of the invention, a key module 210 having a security key 212 thereon is also provided on the UPS unit 102. As mentioned previously, when each UPS unit 102 is assembled in the factory 106, a unique security number or key 212 is assigned to that UPS unit 102 for tracking and control purposes. The unique security key 212 may reside in a read-only memory (ROM), a specialized integrated circuit or chip (e.g., a DS2411), or other suitable tracking devices installed on the key module 210. The security key 212 may then be used to track and control (i.e., permit or deny) the kVA ratings that may be set on the UPS unit 102.

To facilitate tracking and controlling of the kVA ratings, a monitor module 214 may be provided on the UPS unit 102. The monitor module 214 may comprise hardware and any associated software or firmware for storing various items of information concerning the UPS unit 102. Such information may include, for example, the model kVA rating 216, the grant kVA rating 218, and the verification number 220 of the UPS unit 102. Recall that the verification number 220 is an encrypted number that may be generated by the control server 104 based on the grant kVA rating and the security key. Thereafter, each time the UPS unit 102 is powered on, the monitor module 214 reads the grant kVA rating 218 and the security key 212 from the key module 210, reproduces the encrypted verification number, and compares it to the encrypted verification number 220 from the control server 104. Only if the monitor module 214 confirms that the verification numbers match, meaning the security key 212 and the grant kVA rating 218 match their counterparts in the encrypted verification number 220 from the control server 104, is the UPS unit 102 allowed to continue operating. This power-on check helps prevent unauthorized modification of the kVA rating of the UPS unit 102 by unethical customers.

Figure 3:
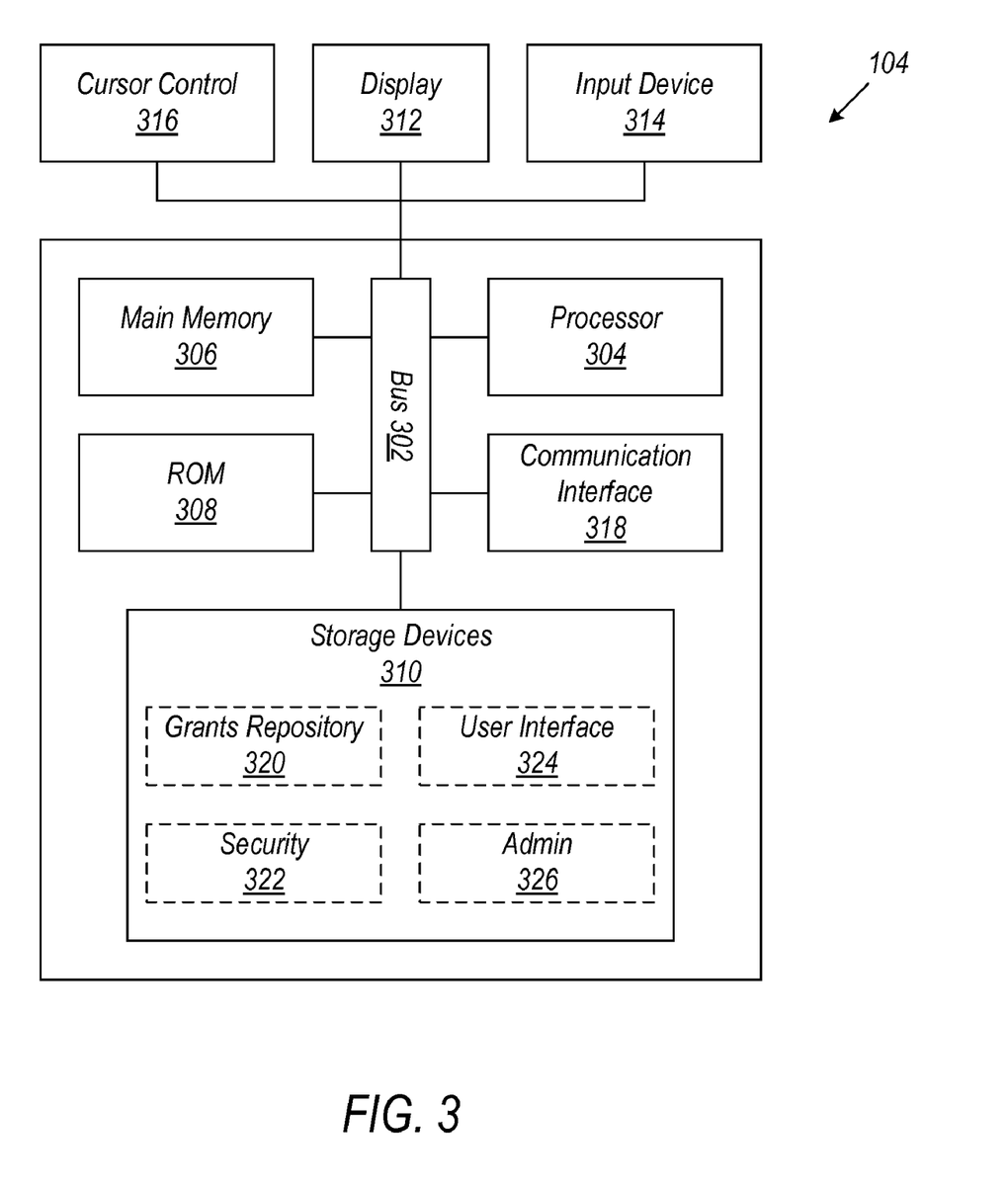
FIG. 3 illustrates an exemplary control server capable of tracking and controlling capacity ratings of UPS units according to embodiments of the invention.

Turning now to FIG. 3, the control server 104 is shown in more detail according to embodiments of the invention. Any suitable computer known to those having ordinary skill in the art may be used as the control server 104, including a personal computer, workstation, server, mainframe, and the like. Such a control server 104 typically includes a bus 302 or other communication mechanism for communicating information and a processor 304 coupled with the bus 302 for processing information. The control server 104 may also include a main memory 306, such as a random access memory (RAM) or other dynamic storage device, coupled to the bus 302 for storing computer-readable instructions to be executed by the processor 304. The main memory 306 may also be used for storing temporary variables or other intermediate information during execution of the instructions to be executed by the processor 304. The control server 104 may further include a read-only memory (ROM) 308 or other static storage device coupled to the bus 302 for storing static information and instructions for the processor 304. A computer-readable storage device 310, such as a magnetic, optical, or solid state device, may be coupled to the bus 302 for storing information and instructions for the processor 304.

The control server 104 may be coupled via the bus 302 to a display 312, such as a cathode ray tube (CRT) or liquid crystal display (LCD), for displaying information to a user. An input device 314, including, for example, alphanumeric and other keys, may be coupled to the bus 302 for communicating information and command selections to the processor 304. Another type of user input device may be a cursor control 316, such as a mouse, a trackball, or cursor direction keys for communicating direction information and command selections to the processor 304, and for controlling cursor movement on the display 312. The cursor control 316 typically has two degrees of freedom in two axes, a first axis (e.g., X axis) and a second axis (e.g., Y axis), that allow the device to specify positions in a plane.

The term "computer-readable instructions" as used above refers to any 20 instructions that may be performed by the processor 304 and or/other components. Similarly, the term "computer-readable medium" refers to any storage medium that may be used to store the computer-readable instructions. Such a medium may take many forms, including, but not limited to, non-volatile media, volatile media, and non-transitory transmission media. Non-volatile media may include, for example, optical or magnetic disks, such as 25 the storage device 310. Volatile media may include dynamic memory, such as main memory 306. Common forms of computer-readable media may include, for 30 example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

Various forms of the computer-readable media may be involved in carrying one or more sequences of one or more instructions to the processor 304 for execution. For example, the instructions may initially be borne on a magnetic disk of a remote computer. The remote computer can load the instructions into its dynamic memory and send the instructions over a telephone line using a modem. A modem local to the control server 104 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received by the main memory 306 may optionally be stored on the storage device 310 either before or after execution by the processor 304.

The control server 104 may also include a communication interface 318 coupled to the bus 302. The communication interface 318 typically provides a two way data communication coupling between the control server 104 and the network 106. For example, the communication interface 318 may be an integrated services digital network (ISDN) card or a modem used to provide a data communication connection to a corresponding type of telephone line. As another example, the communication interface 318 may be a local area network (LAN) card used to provide a data communication connection to a compatible LAN. Wireless links may also be implemented. Regardless of the specific implementation, the main function of the communication interface 318 is to send and receive electrical, electromagnetic, optical, or other signals that carry digital data streams representing various types of information.

In accordance with embodiments of the invention, the storage device 310 may have a number of functional components residing thereon that facilitate operation of the control server 104. For example, there may be a grants repository 320 for tracking and controlling the kVA ratings of the various UPS units 102, a security module 322 for controlling user access to the control server 104, a user interface 324 for allowing users to interact with the control server 104, and an administrative module 226 for allowing a systems operator to administer to the control server 104. Of course, other functional components besides the ones shown in FIG. 3 may be added to the storage device 310, or one or more functional components may be removed from the storage device 310, without departing from the scope of the invention. These functional components 320-326, or rather the computer-readable instructions therefor, may then be executed by the control server 104 to facilitate operation of the control server 104.

The grants repository 320 functions to provide a single, centralized storage location for the kVA ratings of the various UPS units 102, which are typically remotely located at customer sites. These kVA ratings are ratings that have been purchased by the customer 118 or otherwise authorized for use at the customer 118. In general, no UPS unit 102 should operate with a kVA rating that is different from the one listed for that unit in the grants repository 320. This allows UPS manufacturers to easily track which kVA ratings have been authorized for which UPS unit 102 (and vice versa), and to control subsequent kVA ratings upgrades to the UPS units 102. The grants repository 320 may be in any suitable form known to those having ordinary skill in the art, including a table, a file (e.g., a Microsoft Excel spreadsheet), or a database. And information other than the kVA rating for the UPS units 102 may also be stored in the grants repository 320 as needed. A simple example of a grants repository 320 that may be implemented is shown below in the form of a table.

TABLE 1

Grants Repository

| Serial No. | Security Key | Model kVA | Grant kVA | Customer | Grant Code |
|---|---|---|---|---|---|
| 100001 | A1 | 100 kVA | 60 kVA | Company X | — |
| 100002 | B2 | 80 kVA | 80 kVA | Company Y | — |
| 100003 | C3 | 100 kVA | 80 kVA | Company Z | — |

As can be seen in Table 1, for each UPS unit 102, the grants repository 320 may store the serial number, a security key, the model kVA, the grant kVA, the customer name, the grant code, and any other information does having ordinary skill in the art may find pertinent. Then, when a customer 118 wishes to upgrade the kVA rating of a UPS unit 102, the authorized personnel may access the grants repository 320 and modify the grant kVA for the UPS unit 102. Such modification may be performed through a suitable graphical user interface (discussed further below), but it may also be possible to modify the appropriate entries in Table 1 directly. In one embodiment, the new grant kVA may replace the existing grant kVA in the grants repository 320, or an entirely new entry in the grants repository 320 may be created for the new grant kVA, with reference to the previous entry. Of course, an appropriate purchase order and payment for the upgrade should be confirmed beforehand. A service technician may thereafter download the new grant kVA and perform an upgrade of the UPS unit 102 in the manner described previously.

The security module 322 operates to ensure that access to the control server 104 is limited to those personnel that have been authorized. To this end, the security module 322 may provide one or more access control mechanisms commonly known to those having ordinary skill in the art. Such access control mechanisms may include, for example, a login ID, a password, a security question, and the like. The security module 322 may also provide multiple levels of access to the control server 104, each level providing a different degree of access to the control server 104.

The user interface module 324 functions to facilitate interaction between authorized personnel and the various functional components of control server 104. Thus, in one embodiment, the user interface module 324 may be implemented in the form of a graphical user interface for the authorized personnel. The graphical user interface may be in any suitable configuration known to those having ordinary skill in the art, but preferably has a layout, design, and/or format that is easy and intuitive for the authorized personnel to use. The user interface module 324 may also provide other types of user interfaces for receiving input from the authorized personnel, such as a telephone interface, and the like.

Finally, the administrative module 326 allows a system operator to perform various administrative functions with respect to the control server 104. For example, the administrative module 326 may allow the system operator to create new user accounts, modify existing user accounts, change login IDs and passwords, and the like. Other functions a system operator may perform may include, for example, backing up the grants repository 320 from time to time, and generally monitoring the operation of the control server 104.

In the exemplary infrastructure 100 of FIG. 1, a service technician 108 performs the capacity upgrade for the UPS module 102 after obtaining a grant code from the control server 104. In some embodiments, however, instead of the service technician 108 performing the upgrade, the upgrade may be performed automatically by the control server 104. Such an arrangement is illustrated in FIG. 4, where another exemplary infrastructure 400 is shown for tracking and controlling capacity ratings of UPS units according to embodiments of the invention.

Figure 4:
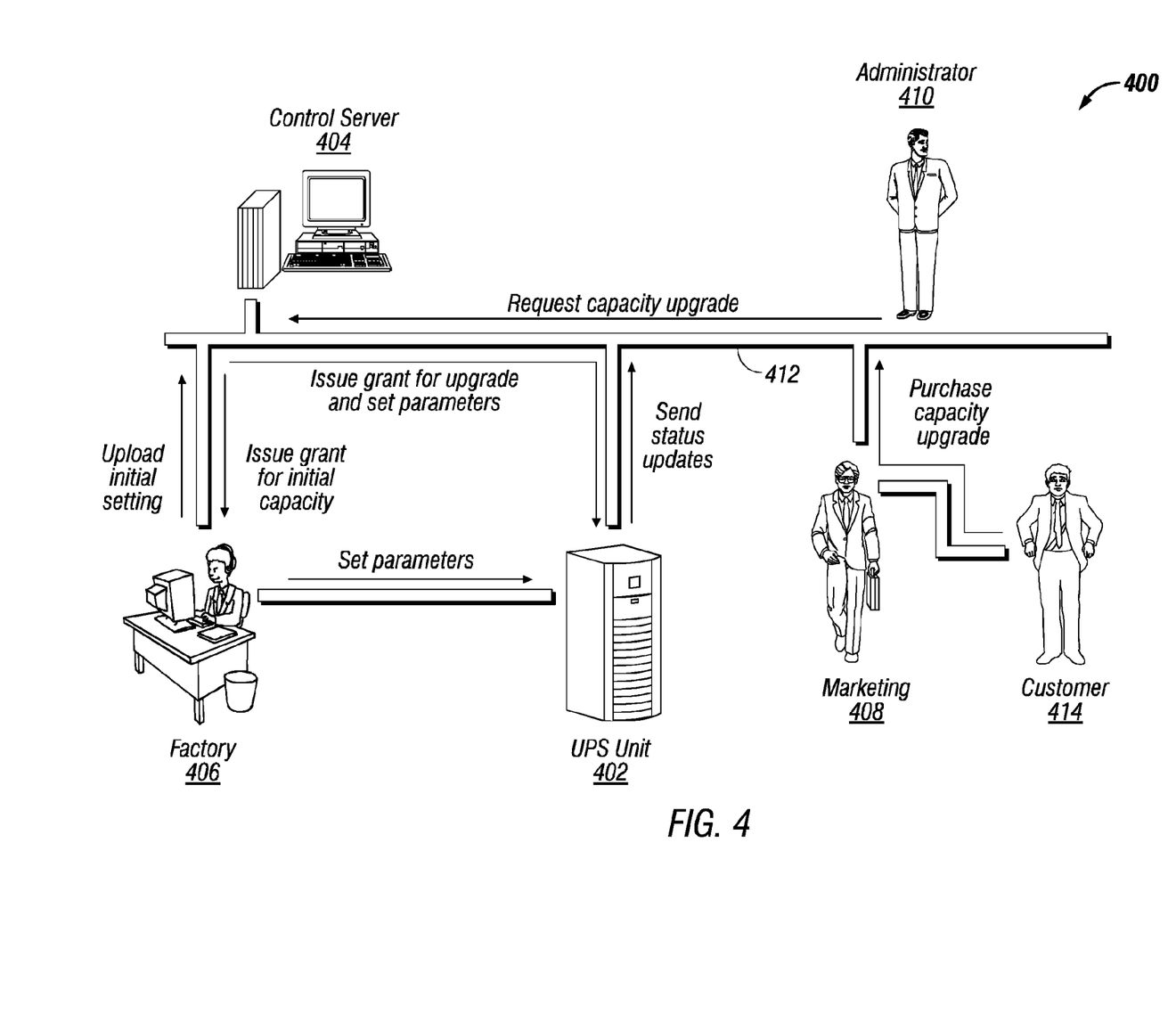
FIG. 4 illustrates an another exemplary infrastructure for tracking and controlling capacity ratings of UPS units according to embodiments of the invention.

As can be seen in FIG. 4, the infrastructure 400 is similar to the infrastructure 100 of FIG. 1 insofar as it may include a remotely located UPS unit 402 and a central control server 404. Also present are a factory 406, marketing personnel 408, and administrative personnel 410, all connected to one another over a network 412, such as the Internet or a private intranet. These components of the infrastructure 400 are similar to their counterparts in FIG. 1 and will therefore not be described again here.

Operation of the infrastructure 400 of FIG. 4 is similar to operation of the infrastructure 100 of FIG. 1 except that no service technician is needed to perform the capacity upgrade. Instead, once a customer 414 has purchased a kVA ratings upgrade and the upgrade has been confirmed by the administrator 410, the control server 404 may directly contact the UPS unit 402 and automatically configure the unit with the new kVA rating. This eliminates the need to have the service technician first obtain a grant code from the control server 404, then perform the upgrade. In addition, by virtue of the direct connection, the control server 404 may be used to monitor the operation of the UPS unit 402 via status reports issued from time to time by the UPS unit 402 to the control server 404. Such an arrangement allows the control center 404 to detect, for example, any failures or errors that may occur during the operation of the UPS unit 402.

Figure 5:
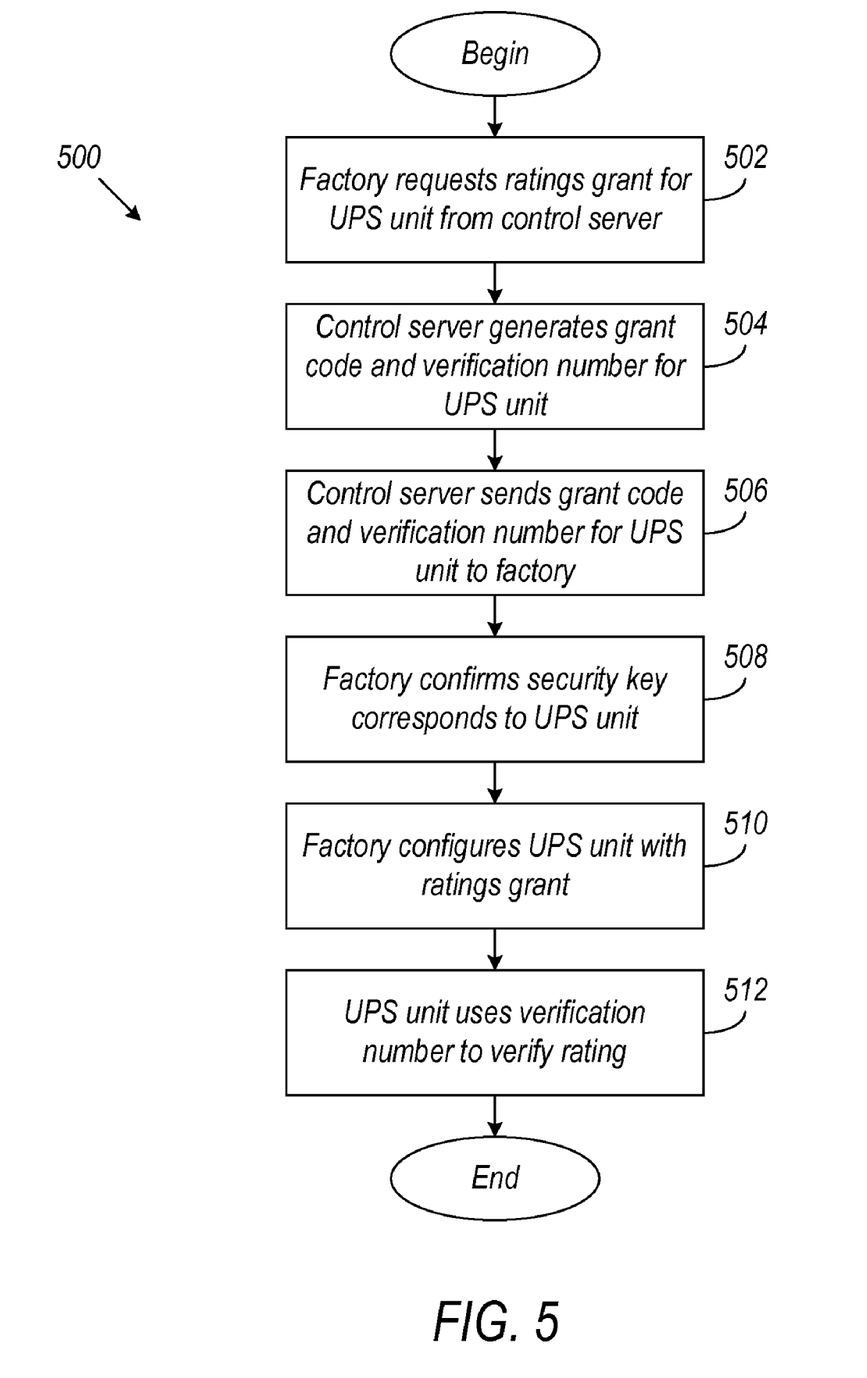
FIG. 5 illustrates an exemplary flow chart for tracking and controlling capacity ratings of UPS units according to embodiments of the invention.

Thus far, specific embodiments have been disclosed for tracking and controlling capacity ratings of UPS units. Referring now to FIG. 5, general guidelines are shown in the form of a method 500 that may be used by a UPS manufacturer to implement the various embodiments of the invention disclosed. As can be seen, the method 500 begins at block 502, where a factory requests a ratings grant for a UPS unit from a control server. At block 504, the control server generates a grant code containing a security key and the ratings grant for the UPS unit along with a verification number. The control server then sends the grant code for the UPS unit along with the verification number to the factory at block 506. The factory confirms the security key in the grant code corresponds to the UPS unit at block 508. The factory thereafter configures the UPS unit with the ratings grant at block 510. The verification number may then be stored in the UPS unit at block 512 and used as part of a power-on check in the manner described above to verify that the UPS unit is operating at its authorized kVA rating.

Figure 6:
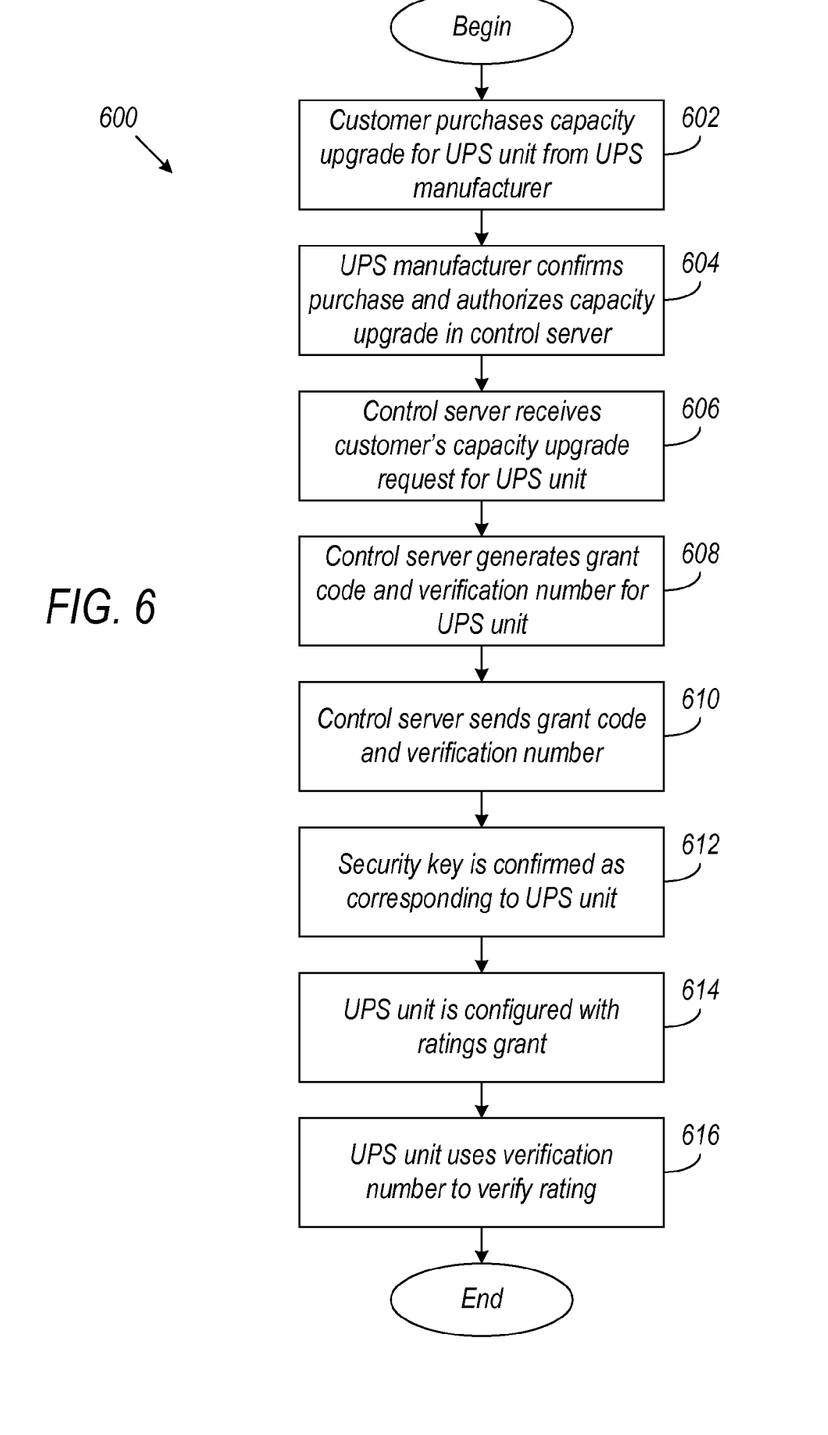
FIG. 6 illustrates another exemplary flow chart for tracking and controlling capacity ratings of UPS units according to embodiments of the invention.

FIG. 6 illustrates another method 600 that may be used by a UPS manufacturer to implement the various embodiments of the invention disclosed herein. The method 600 begins at block 602, where a customer purchases a capacity upgrade for a UPS unit from a UPS manufacturer. At block 604, the UPS manufacturer confirms the purchase and authorizes the capacity upgrade in a control server. The control server thereafter receives a request for a capacity upgrade at block 606. The request may be made by a service technician in some embodiments, or it may be made directly by the UPS unit at the customer in some embodiments.

At block 608, the control server generates a grant code containing a security key and a grant kVA rating for the UPS unit along with a verification number. The control server may then send the grant code along with the verification number. Depending on the particular embodiment, the control server may send the grant code and the verification number first to the service technician, or it may send them directly to the UPS unit at the customer. If the grant code and the verification number are sent to the service technician first, then at block 612, then the service technician may extract the grant kVA rating and the security key, and may use the security to confirm that the UPS unit is the correct unit. If grant code and the verification number are sent directly to the UPS unit, then it is the control server that may confirm the UPS unit is the correct unit using the security key. At block 614, depending on the particular implementation, either the service technician may configure the UPS unit with the grant kVA rating (via the configuration software), or the control server may configure the UPS unit with the grant kVA rating. The verification number may then stored in the UPS unit at block 616 and used as part of a power-on check in the manner described above to verify that the unit is operating at its authorized kVA rating.

The foregoing description of the invention has been provided in the context of preferred and other embodiments and not every embodiment of the invention has been described. Also, obvious modifications and alterations to the described embodiments may be readily available to those of ordinary skill in the art. Therefore, the disclosed (and undisclosed) embodiments are not intended to limit or restrict the scope or applicability of the invention conceived of by the Applicants; rather, in conformity with the patent laws, Applicants intend to fully protect all such modifications and improvements that come within the scope or range of equivalent of the following claims.

What is claimed is:

1. A method of managing capacity ratings for an uninterruptible power supply (UPS) unit capable of multiple capacity ratings, the method comprising:
    generating a grant code for the UPS unit at a first location, the grant code including an authorized capacity rating for the UPS unit;
    transferring the grant code to a second location different from the first location;
    extracting the authorized capacity rating from the grant code at the second location; and
    configuring the UPS unit to operate with the authorized capacity rating extracted from the grant code.

2. The method according to claim 1, wherein the grant code additionally includes a security key of the UPS unit, further comprising extracting the security key from the grant code at the second location and verifying the UPS unit using the security key.

3. The method according to claim 1, further comprising comparing the authorized capacity rating, the actual security key of the UPS unit and a verification number stored in the UPS unit to prevent operation of the UPS unit if a predefined condition is not met.

4. The method according to claim 3, wherein the comparing is performed during a power-on check of the UPS unit.

5. The method according to claim 1, wherein the generating of the grant code is performed in response to a request for an initial capacity rating.

6. The method according to claim 1, wherein the generating of the grant code is performed in response to a request for a capacity rating upgrade.

7. The method according to claim 1, wherein the second location is a customer location and the configuring of the UPS unit is performed by a control server at the first location.

8. The method according to claim 1, wherein the second location is a service technician location and the configuring of the UPS unit is performed by a service technician.

9. The method according to claim 8, wherein the service technician performs the configuring of the UPS unit using a software configuration tool.

10. The method according to claim 1, further comprising monitoring operation of the UPS unit for failures or errors from the first location.

11. An uninterruptible power supply (UPS) unit capable of multiple capacity ratings, comprising:
    an input source or a stored energy source adapted to provide power for the UPS unit;
    a monitor module adapted to store an initial capacity rating for the UPS unit and a maximum capacity rating for the UPS unit; and
    electrical components adapted to impose a limit on the power provided by the input source or the stored energy source of the UPS unit;
    wherein the electrical components may be configured to increase the limit on the power provided by the input source or the stored energy source of the UPS unit from the initial capacity rating up to the maximum capacity rating.

12. The UPS unit according to claim 11, wherein the limits on the power provided by the input source or the stored energy source of the UPS unit may be increased in predefined increments, the predefined increments corresponding to optimum design points of the UPS unit.

13. The UPS unit according to claim 11, wherein the electrical components are fully-rated components comprising one or more of: an input/output termination block, a circuit breaker, a fuse block, power wiring, a transformer, a capacitor, power electronic switching devices and a conductor.

14. The UPS unit according to claim 11, further comprising a key module adapted to store a unique security key for the UPS unit, the security key being usable to prevent changes from being made to the limit on the power provided by the input source or the stored energy source of the UPS unit.

15. The UPS unit according to claim 11, wherein the UPS unit may be combined in parallel with one or more additional UPS units having the same or a different capacity rating as the UPS unit.

16. A computer-readable non-transitory medium encoded with computer-readable instructions for managing capacity ratings in an uninterruptible power supply (UPS) unit capable of multiple capacity ratings, the computer-readable instructions comprising instructions for causing a computer to:
   generate a grant code for the UPS unit, the grant code including an authorized capacity rating for the UPS unit;
   store the grant code for the UPS unit in a grants repository;
   receive a request for a capacity rating from a remote location in connection with the UPS unit;
   and transmit the grant code stored in the grants repository to the remote location over a network.

17. The computer-readable non-transitory medium according to claim 16, wherein the computer-readable instructions further comprise instructions for causing a computer to limit access to the grants repository only to authorized users.

18. The computer-readable non-transitory medium according to claim 16, wherein the computer-readable instructions further comprise instructions for causing a computer to present a graphical user interface for allowing users to access the grants repository.

19. The computer-readable non-transitory medium according to claim 16, wherein the computer-readable instructions further comprise instructions for causing a computer to provide multiple types of user accounts, each type of user account having a different level of access to the grants repository.

20. The computer-readable non-transitory medium according to claim 16, wherein the network is one of: a private intranet, and the Internet.

\* \* \* \* \*